US012569395B2

(12) United States Patent
Zhou

(10) Patent No.: US 12,569,395 B2
(45) Date of Patent: Mar. 10, 2026

(54) PERISTALTIC MASSAGER

(71) Applicant: Dongguan Mengma Electronic Technology Co., Ltd., Dongguan City (CN)

(72) Inventor: Dongtao Zhou, Dongguan City (CN)

(73) Assignee: Dongguan Mengma Electronic Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/203,075

(22) Filed: May 8, 2025

(65) Prior Publication Data

US 2025/0262117 A1 Aug. 21, 2025

(30) Foreign Application Priority Data

Mar. 21, 2025 (CN) ......................... 202520517693.5

(51) Int. Cl.
*A61H 23/02* (2006.01)
*A61H 15/00* (2006.01)

(52) U.S. Cl.
CPC ......... *A61H 15/0085* (2013.01); *A61H 23/02* (2013.01); *A61H 2201/0153* (2013.01); *A61H 2201/123* (2013.01); *A61H 2201/149* (2013.01); *A61H 2201/1635* (2013.01); *A61H 2201/1692* (2013.01)

(58) Field of Classification Search
CPC ............ A61H 15/0085; A61H 15/0078; A61H 15/00; A61H 23/02; A61H 23/00; A61H 2201/0153; A61H 2201/123; A61H 2201/149; A61H 2201/1635; A61H 2201/1692; A61H 2201/5097; A61H 2201/0157; A61H 2201/0192; A61H 7/007; A61H 7/00; A61H 19/00; A61H 19/30; A61H 19/32; A61H 19/34; A61H 19/40; A61H 19/44; A61H 19/50
See application file for complete search history.

(56) References Cited

U.S. PATENT DOCUMENTS

| | | | | |
|---|---|---|---|---|
| 9,737,458 B1 * | 8/2017 | Olivares | A61H 21/00 | |
| 11,478,400 B1 * | 10/2022 | Marton | A61H 23/006 | |
| 12,127,993 B1 * | 10/2024 | Peng | A61H 23/0263 | |
| 12,178,775 B1 * | 12/2024 | Wang | A61H 19/34 | |
| 12,208,053 B1 * | 1/2025 | Liu | A61H 23/006 | |
| 12,285,377 B1 * | 4/2025 | Lu | A61H 23/02 | |
| 12,295,899 B1 * | 5/2025 | Sheng | A61H 23/006 | |
| 12,447,098 B1 * | 10/2025 | He | A61H 19/44 | |
| 12,472,121 B1 * | 11/2025 | Suo | A61H 19/44 | |
| 2011/0034837 A1 * | 2/2011 | Lee | A61H 23/00 | 600/38 |
| 2013/0101340 A1 * | 4/2013 | Liu | A61H 23/0263 | 401/208 |
| 2016/0331629 A1 * | 11/2016 | Pearson | A61H 19/44 | |
| 2016/0354277 A1 * | 12/2016 | Fima | A61H 19/44 | |
| 2019/0350793 A1 * | 11/2019 | Wersland | A61H 23/006 | |

(Continued)

*Primary Examiner* — Timothy A Stanis
*Assistant Examiner* — Tyler A Raubenstraw

(57) ABSTRACT

A peristaltic massager, where a reciprocating driving mechanism drives a peristaltic sliding member to reciprocate to realize linear motion of massage heads on the peristaltic sliding member along a length direction of a gripping body, and the motion drives the massage heads to move to achieve the effect of automatic massage, making the use of the peristaltic massager more convenient.

12 Claims, 5 Drawing Sheets

(56) References Cited

U.S. PATENT DOCUMENTS

| | | | | |
|---|---|---|---|---|
| 2021/0169731 | A1* | 6/2021 | Haddock Dicarlo | A61H 21/00 |
| 2021/0393475 | A1 | 12/2021 | He | |
| 2022/0015983 | A1* | 1/2022 | Li | A61H 23/0218 |
| 2023/0277408 | A1* | 9/2023 | Luo | A61H 19/32<br>601/84 |
| 2024/0050307 | A1* | 2/2024 | Luo | A61H 19/44 |
| 2024/0099930 | A1* | 3/2024 | Luo | A61H 7/00 |
| 2024/0108538 | A1 | 4/2024 | Chen | |
| 2024/0299239 | A1* | 9/2024 | Yan | A61H 19/30 |
| 2024/0382372 | A1* | 11/2024 | Zhou | A61H 23/006 |
| 2024/0382376 | A1* | 11/2024 | Zhang | A61H 23/0254 |
| 2024/0398660 | A1* | 12/2024 | Lin | A61H 19/44 |
| 2025/0032351 | A1* | 1/2025 | Yan | A61H 19/30 |
| 2025/0143960 | A1* | 5/2025 | Wu | A61H 7/005 |
| 2025/0195324 | A1* | 6/2025 | Chen | A61H 23/0254 |
| 2025/0248888 | A1* | 8/2025 | Wang | A61H 19/44 |

* cited by examiner

PERISTALTIC MASSAGER

TECHNICAL FIELD

The present invention belongs to the technical field of massagers, and in particular relates to a peristaltic massager.

BACKGROUND

Handheld massagers are configured to massage acupoints of the human body to achieve the functions of health preservation and maintenance. Existing handheld massagers usually each include a handheld handle on which a massage head is provided, so that the massage head is pressed against the part to be massaged, and then the handheld handle is manually pushed back and forth to make the massage head reciprocate on the part to be massaged, thereby achieving the massage effect.

However, pushing the handheld handle manually requires continuous reciprocating motion, resulting in inconvenience in use.

SUMMARY

In view of the deficiencies of the prior art, it is an object of the present invention to provide a peristaltic massager which further facilitates use, where a reciprocating driving mechanism drives a peristaltic sliding member to reciprocate to realize linear motion of massage heads on the peristaltic sliding member along a length direction of a gripping body, and the motion drives the massage heads to move to achieve the effect of automatic massage.

In order to achieve the above object, the present invention provides the following technical solution.

A peristaltic massager includes a gripping body; and a peristaltic mechanism, where peristaltic mechanism includes a peristaltic sliding member and a reciprocating driving mechanism; the peristaltic sliding member is movably arranged on a massage portion for massage on the gripping body, and at least one massage head of the peristaltic sliding member protrudes from a surface of the massage portion of the gripping body; the reciprocating driving mechanism is mounted in the gripping body, and the reciprocating driving mechanism and the peristaltic sliding member are arranged in linkage, so that the reciprocating driving mechanism drives the massage head of the peristaltic sliding member to perform linear reciprocating motion on the surface of the massage portion of the gripping body.

By adopting the above technical solution, the following beneficial effects are realized:

1. The reciprocating driving mechanism drives the peristaltic sliding member to reciprocate to realize the linear reciprocating motion of the massage head on the peristaltic sliding member, and the motion drives peristaltic motion of the massage head to achieve the effect of automatic massage, making the use more convenient.

2. A fitting portion enables the peristaltic sliding member to move in different directions to realize reciprocating motion by fitting a first spiral track and a second spiral track with opposite spiral directions.

3. As the first spiral track and the second spiral track are arranged to intersect, the number of turns of a rotating screw in one cycle is greater than one, which can reduce reciprocating speed of the massage head to improve the comfort of massage.

4. Arranging the fitting portion in an arc shape causes the fitting portion to continue to move along the current track to ensure the motion trajectory when passing through an intersection of the first spiral track and the second spiral track.

5. Transition tracks are arranged to connect the first spiral track and the second spiral track, and a linkage member is rotatably provided on the peristaltic sliding member, so that when the fitting portion switches between the first spiral track and the second spiral track, the linkage member is guided by the transition tracks to rotate relative to the peristaltic sliding member to change an arc length direction of the fitting portion, so that the fitting portion can switch between the first spiral track and the second spiral track.

Figure 1:
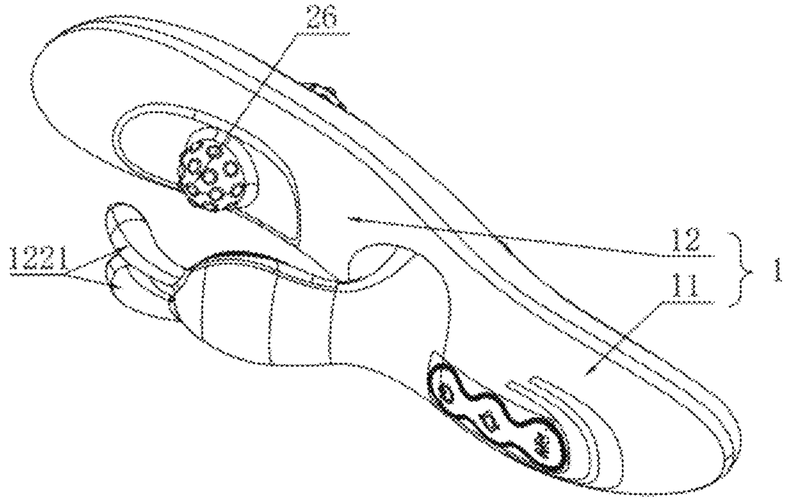
FIG. 1 is an assembly view of an embodiment of the present invention.
Figure 2:
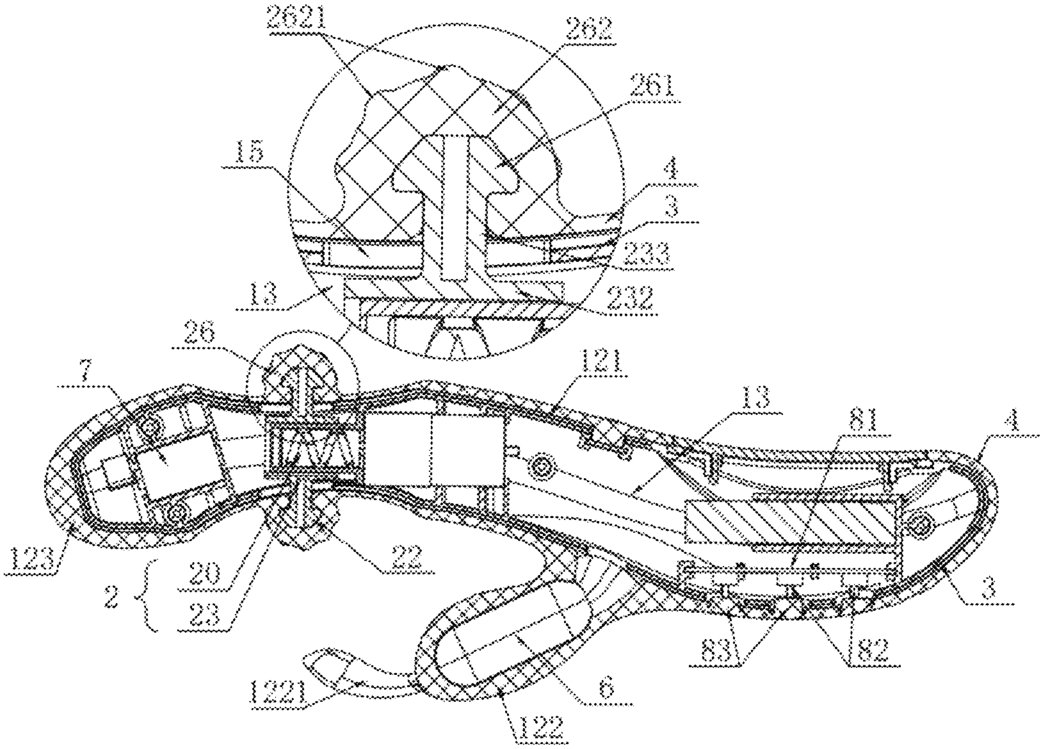
FIG. 2 is a cross-sectional view of an embodiment of the present invention.
Figure 3:
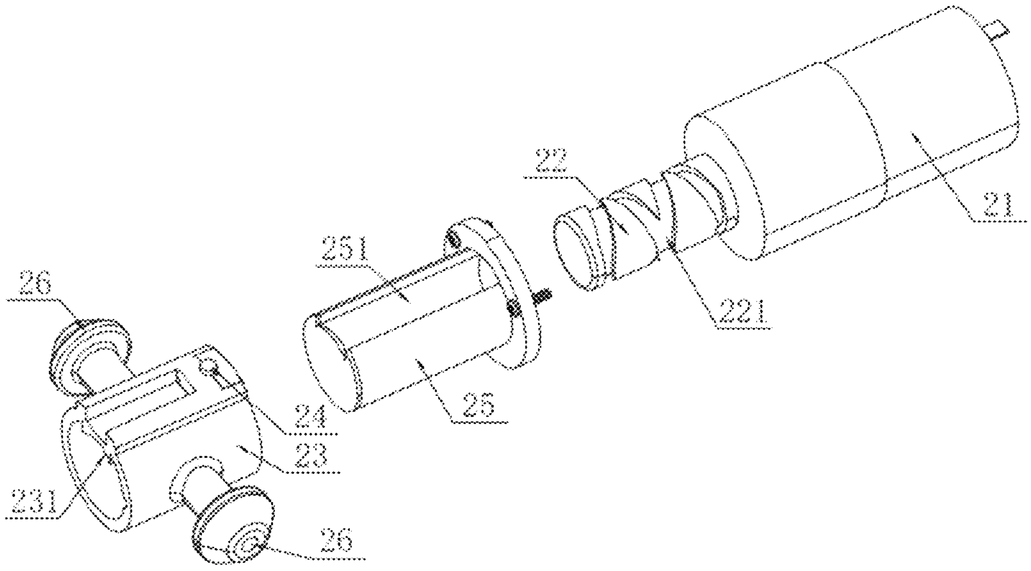
FIG. 3 is an exploded view of a peristaltic mechanism in an embodiment of the present invention.
Figure 4:
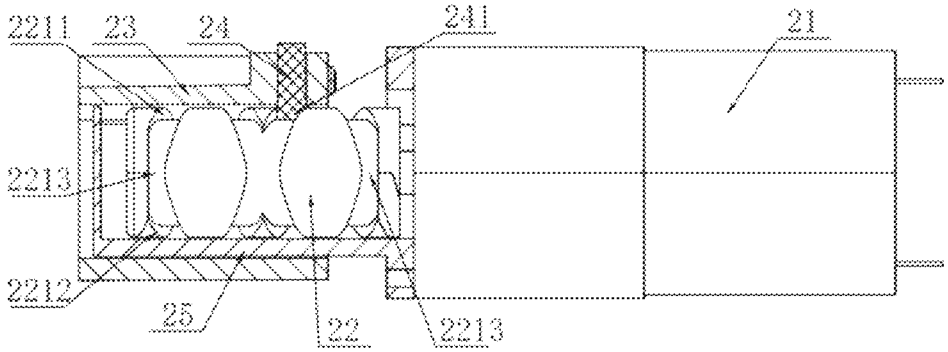
FIG. 4 is a cross-sectional view of a peristaltic mechanism in an embodiment of the present invention.
Figure 5:
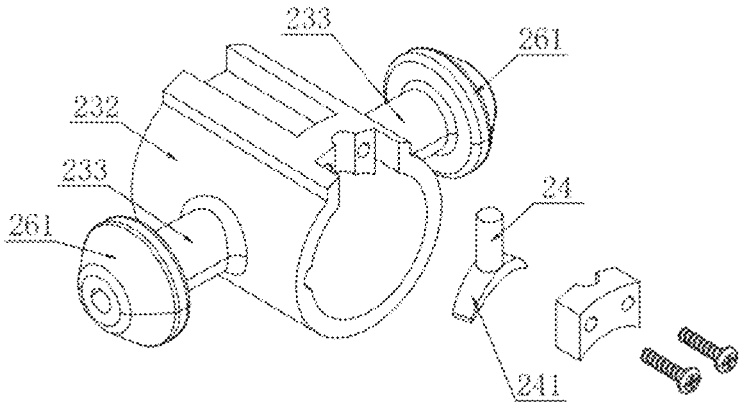
FIG. 5 is an exploded view of a peristaltic sliding member in an embodiment of the present invention.

Description of reference numerals: 1. gripping body; 11. gripping portion; 12. massage portion; 13. mounting inner cavity; 14. action cavity; 15. extending opening; 16. first guide portion; 17. second guide portion; 121. first functional portion; 122. second functional portion; 123. third functional portion; 1221. massage contact; 2. peristaltic mechanism; 20. reciprocating driving mechanism; 21. first motor; 22. rotating screw; 23. peristaltic sliding member; 24. linkage member; 25. guide member; 26. massage head; 221. reciprocating track; 231. sliding block; 232. sleeve portion; 233. extension portion; 234. connecting portion; 241. fitting portion; 251. guide opening; 261. hard inner core; 262. elastic outer sheath; 2211. first spiral track; 2212. second helical track; 2213. transition track; 2341. first sliding portion; 2342. second sliding portion; 2621. massage protrusion; 3. hard inner shell; 4. elastic outer shell; 51. first inner shell; 52. second inner shell; 6. vibration device; 7. vibration motor; 81. circuit board; 82. control switch; 83. elastic button; and 9. connecting rod.

DESCRIPTION OF THE EMBODIMENTS

As shown in FIGS. 1-5, the present invention discloses a peristaltic massager including a gripping body 1 and a peristaltic mechanism 2, where the gripping body 1 is in a long strip shape extending leftward and rightward, that is, an axis of the gripping body 1 is along the left-right direction; the gripping body 1 includes a gripping portion 11 at a right end and a massage portion 12 at a left end, and the massage portion 12 further includes a first functional portion 121, a second functional portion 122 and a third functional portion 123; a right end of the first functional portion 121 is connected with the gripping portion 11, and a left end thereof is connected with the third functional portion 123; the second functional portion 122 is arranged on a front side of the right end of the first functional portion 121, and the second functional portion 122 is arranged to extend forward and leftward; the peristaltic mechanism 2 is arranged in the first functional portion 121, specifically, the peristaltic mechanism 2 includes a peristaltic sliding member 23 and a reciprocating driving mechanism 20, the peristaltic sliding member 23 is movably arranged in the first functional portion 121 in the left-right direction, and at least one massage head 26 of the peristaltic sliding member 23 protrudes from a surface of the first functional portion 121; the reciprocating driving mechanism 20 is mounted in the first functional portion 121, and the reciprocating driving mechanism 20 and the peristaltic sliding member 23 are arranged in linkage, so that the reciprocating driving mechanism 20 drives the massage head 26 to reciprocate on the surface of the first functional portion 121 in the left-right direction; and by contacting the massage head 26 with the human body and peristaltic movement of the massage head 26, acupoints are massaged to achieve the effect of health preservation and maintenance.

Therefore, an axis of the peristaltic mechanism 2 and an axis of the gripping body 1 are arranged coaxially or parallel to each other to cause the reciprocating driving mechanism 20 to drive the peristaltic sliding member 23 to reciprocate, so that the massage head 26 on the peristaltic sliding member 23 moves linearly along a length direction of the gripping body 1, and the motion drives the massage head 26 to move to achieve the effect of automatic massage, making the use more convenient.

In other embodiments, the axis of the peristaltic mechanism 2 is arranged inclined relative to the axis of the gripping body 1, so that a motion direction of the massage head 26 can be inclined at a certain angle relative to the left-right direction.

Specifically, the reciprocating driving mechanism 20 includes a first motor 21, a rotating screw 22, a linkage member 24 and a guide member 25; the first motor 21 is fixed to the first functional portion 121 by bolts, and an output shaft of the first motor 21 is arranged to the left; the rotating screw 22 is fixed on the output shaft of the first motor 21, and an axial direction of the rotating screw 22 is along the left-right direction, so that the first motor 21 works to drive the rotating screw 22 to rotate; and the guide member 25 is fixed to the first functional portion 121 by bolts, and the guide member 25 is arranged in a cylindrical shape to be sleeved on an outer periphery of the rotating screw 22. In addition, an upper side of the guide member 25 is provided with a guide opening 251 extending leftward and rightward, and the peristaltic sliding member 23 is provided with a sliding block 231 fitted to the guide opening 251 to realize sliding arrangement of the peristaltic sliding member 23 in the left-right direction. In addition, a reciprocating track 221 is provided on the rotating screw 22. Specifically, the reciprocating track 221 includes a first spiral track 2211, a second spiral track 2212 and transition tracks 2213; the first spiral track 2211 and the second spiral track 2212 have opposite spiral directions and are arranged to intersect; and two transition tracks 2213 are provided, and the two transition tracks 2213 respectively connect same ends of the first spiral track 2211 and the second spiral track 2212. In addition, the linkage member 24 is in a cylindrical shape, and an axial direction of the linkage member 24 is arranged vertically; the peristaltic sliding member 23 is clamped on an outer periphery of the linkage member 24 to achieve rotatable arrangement of the linkage member 24 on the peristaltic sliding member 23; a lower end of the linkage member 24 is provided with a fitting portion 241 fitted downward into the reciprocating track 221, the fitting portion 241 is arranged in an arc shape, and the linkage member 24 rotates relative to the peristaltic sliding member 23 to change an arc length direction of the fitting portion 241, so that when the first motor 21 drives the rotating screw 22 to rotate, the peristaltic sliding member 23 is driven to move to the left by the fit between the fitting portion 241 and the first spiral track 2211, and after the fitting portion 241 moves to an end portion of the first spiral track 2211, and under the guidance of the transition tracks 2213, the linkage member 24 is rotated relative to the peristaltic sliding member 23 to change the arc length direction of the fitting portion 241 to transition into the second spiral track 2212, then the fitting portion 241 and the second spiral track 2212 cooperate to drive the peristaltic sliding member 23 to move to the right; and after the fitting portion 241 moves to an end portion of the second spiral track 2212, under the guidance of the transition tracks 2213, the linkage member 24 is rotated relative to the peristaltic sliding member 23 to change the arc length direction of the fitting portion 241 to transition into the first spiral track 2211, thus completing a cycle.

Therefore, the fitting portion 241 enables the peristaltic sliding member 23 to move in different directions to realize reciprocating motion by fitting the first spiral track 2211 and the second spiral track 2212 having opposite spiral directions, and the first spiral track 2211 and the second spiral track 2212 are arranged to intersect, the number of turns of the rotating screw 22 in one cycle is greater than one, so that a reciprocating speed of the massage head 26 can be reduced to improve the comfort of massage. In addition, by arranging the fitting portion 241 in an arc shape so that when the fitting portion 241 passes through the intersection of the first spiral track 2211 and the second spiral track 2212, the fitting portion will continue to move along the current track to ensure the motion trajectory. In addition, the transition tracks 2213 are provided to connect the first spiral tract 2211 and the second spiral tract 2212, and the linkage member 24 is rotatably arranged on the peristaltic sliding member 23, so that when the fitting portion 241 switches between the first spiral tract 2211 and the second spiral tract 2212, under the guidance of the transition tracks 2213, the linkage member 24 is rotated relative to the peristaltic sliding member 23 to change the arc length direction of the fitting portion 241, so that the fitting portion 241 can switch between the first spiral tract 2211 and the second spiral tract 2212.

Preferably, a motion stroke of the massage head 26 is s, $s \geq 3$ mm.

Preferably, the number of turns of the first spiral track 2211 and the second spiral track 2212 is 1-3.

Here, the massage head 26 includes a hard inner core 261 and an elastic outer sheath 262, the hard inner core 261 is connected with the peristaltic sliding member 23, the elastic outer sheath 262 is arranged on an outer periphery of the hard inner core 261, and a plurality of massage protrusions 2621 are arranged on an outer periphery of the elastic outer sheath 262 to ensure stability of the massage head 26 connected to the peristaltic sliding member 23 by the hard inner core 261, and to ensure the comfort of massage through material characteristics of the elastic outer sheath 262. In addition, arrangement of the massage protrusions 2621 further enhances the massage effect.

Here, the gripping body 1 includes a hard inner shell 3 and an elastic outer shell 4, the hard inner shell 3 is formed by splicing two plastic members, and the elastic outer shell 4 is plastic-coated on an outer side of the hard inner shell 3. In addition, a mounting inner cavity 13 is provided in the hard inner shell 3, the mounting inner cavity 13 is configured to mount the peristaltic mechanism 2, and the hard inner shell 3 is provided with extending openings 15 inwardly penetrating and communicating with the mounting inner cavity 13 on front and rear sides of the first functional portion 121 respectively. In this case, at least one massage head 26 may be provided only in one extending opening 15, or at least one massage head 26 may be provided in each extending opening 15.

Preferably, the elastic outer sheath 262 is integrally formed with the elastic outer shell 4 to close the extending openings 15.

Therefore, the hard inner shell 3 provides a stable mounting inner cavity 13 for the peristaltic mechanism 2 to be stably mounted through its own rigid material characteristics, and the elastic outer shell 4 is plastic-coated on the outer side of the hard inner shell 3 to make it more comfortable when in contact with the skin. In addition, two massage heads 26 are provided to perform massage at the front and rear sides of the first functional portion 121 to improve the comfort of massage. In addition, the elastic outer sheath 262 and the elastic outer shell 4 are integrally formed, so that the extending openings 15 can be closed to ensure sealing of the mounting inner cavity 13, which has the effect of waterproofing and dustproofing.

In other embodiments, the extending opening 15 may be provided only on the front side or the rear side of the first functional portion 121, so that only one massage head 26 may be provided.

Figure 10:
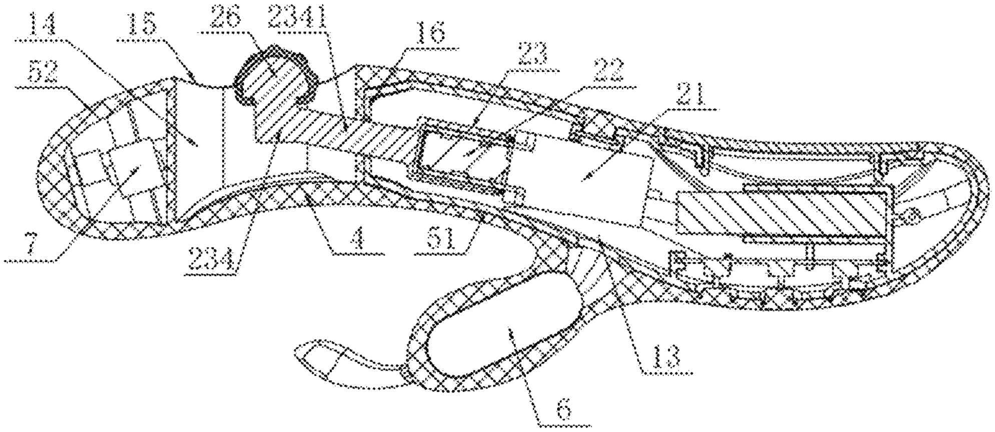
FIG. 10 is a schematic view of an embodiment of the present invention.
Figure 12:
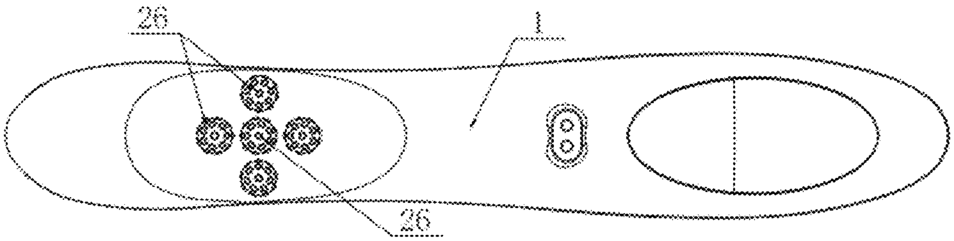
FIG. 12 is a schematic view of an embodiment of the present invention.

In other embodiments, one or more massage heads 26 may be provided in each extending opening 15. When a plurality of massage heads 26 are provided, the plurality of massage heads 26 may be arranged along a straight line as shown in FIG. 10, or may be arranged in an annular array as shown in FIG. 12, or may be arranged along a curve or a circumferential direction or in a rectangular array, and each massage head 26 is connected with the peristaltic sliding member 23.

Preferably, the peristaltic sliding member 23 includes a sleeve portion 232 sleeved on an outer periphery of the guide member 25 and an extension portion 233 provided on an outer periphery of the sleeve portion 232, and the extension portion 233 penetrates outwardly out of the extending opening 15 and is connected with the hard inner core 261.

Therefore, the stability of assembly is improved by sleeving the guide member 25 with the sleeve portion 232, and the extension portion 233 is directly arranged on the outer periphery of the sleeve portion 232, making the structure more concise.

Here, the second functional portion 122 is integrally formed with the elastic outer shell 4. In addition, a vibration device 6 is provided in the second functional portion 122, and the second functional portion 122 is provided with two massage contacts 1221 at one end thereof away from the gripping portion 11. Therefore, the second functional portion 122 is vibrated by the operation of the vibration device 6, the massage contacts 1221 are driven to vibrate, and the massage contacts 1221 come into contact with the human body to perform massage.

Here, a vibration motor 7 is provided in the third functional portion 123, and the vibration motor 7 is mounted in the hard inner shell 3 to ensure stability.

When the vibration motor 7 is working, the third functional portion 123 can be driven to vibrate, so that the third functional portion 123 comes into contact with the human body to perform massage, and the third functional portion 123 is away from the gripping portion 11, so that when the gripping portion 11 is gripped, the vibration amplitude of the third functional portion 123 is large, making the vibration massage effect good.

Here, the vibration device 6 may adopt a structure with the same principle as the vibration motor 7.

In addition, a circuit board 81 and a control switch are provided in the gripping portion 11; and the control switch 82, the first motor 21, the vibration device 6 and the vibration motor 7 are electrically connected with the circuit board 81 respectively. In addition, an elastic button 83 is provided on a surface of the gripping portion 11, and the control switch 82 is triggered by pressing the elastic button 83, so that the circuit board 81 can control the first motor 21, the vibration device 6 and the vibration motor 7.

Here, the elastic button 83 is integrally formed with the elastic outer shell 4 to realize waterproofing and dustproofing.

As shown in FIGS. 6 to 9, in other embodiments, the mounting inner cavity 13 and an action cavity 14 adjacent thereto are provided in the gripping body 1, the mounting inner cavity 13 is configured to mount the peristaltic mechanism 2, and the action cavity 14 is located at a left end of the mounting inner cavity 13. In the embodiments shown in FIGS. 6 and 8, front and rear sides of the mounting inner cavity 14 are provided with the extending openings 15.

Figure 7:
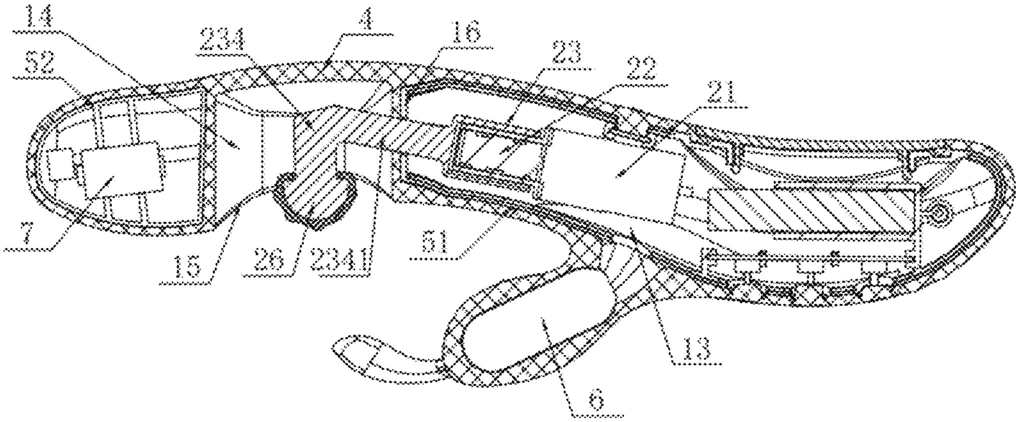
FIG. 7 is a cross-sectional view of an embodiment of the present invention.
Figure 9:
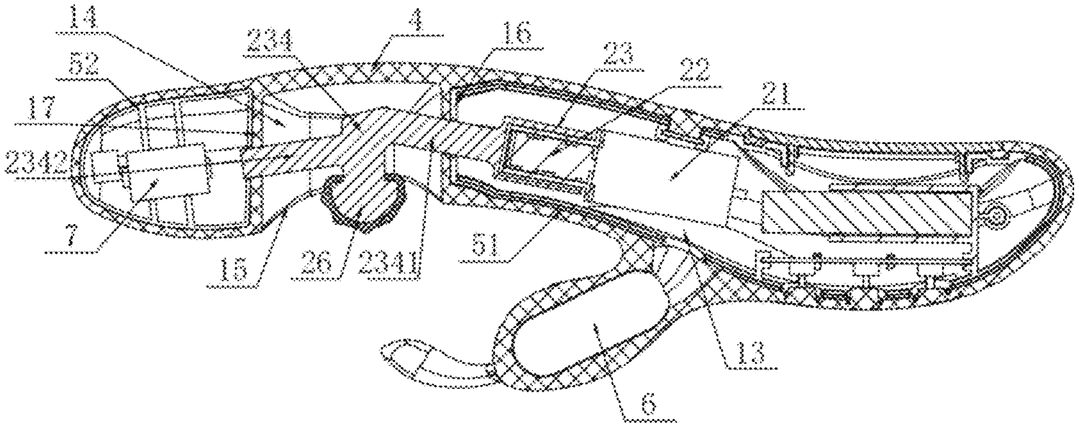
FIG. 9 is a cross-sectional view of an embodiment of the present invention.

In the embodiments shown in FIGS. 7 and 9, the extending opening 15 is provided on the front side of the actuation cavity 14, and the peristaltic sliding member 23 is provided with a connecting portion 234 extending from the mounting inner cavity 13 into the actuation cavity 14.

In the embodiment shown in FIGS. 10, the extending opening 15 is provided on the rear side of the actuation cavity 14, and the peristaltic sliding member 23 is provided with a connecting portion 234 extending from the mounting inner cavity 13 into the actuation cavity 14.

Figure 6:
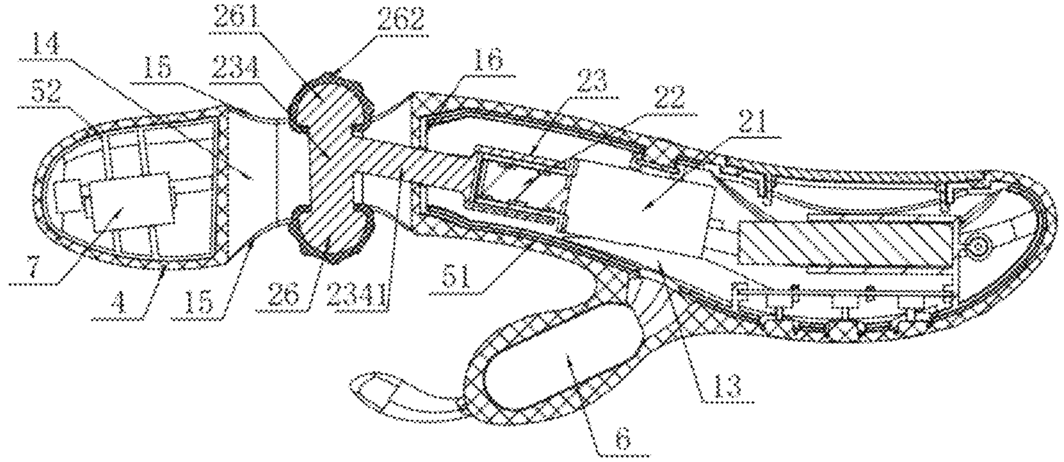
FIG. 6 is a cross-sectional view of an embodiment of the present invention.
Figure 8:
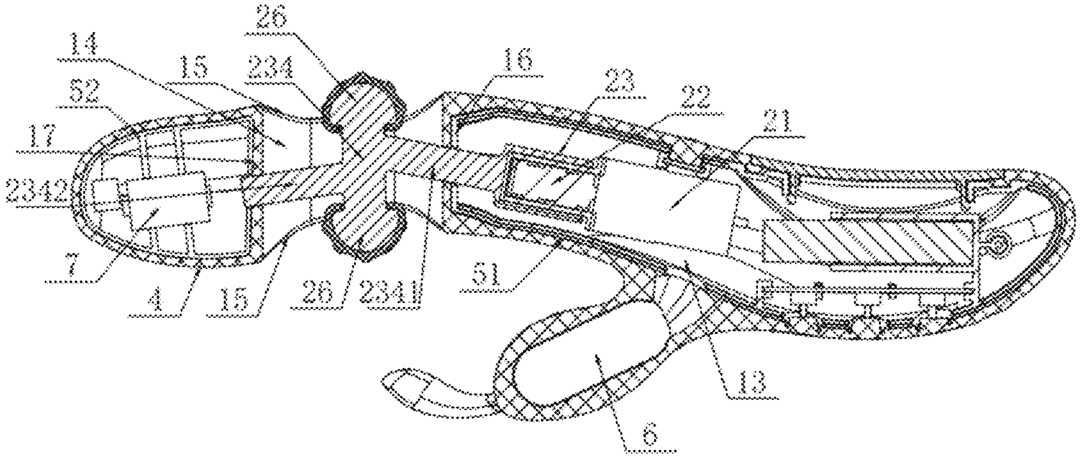
FIG. 8 is a cross-sectional view of an embodiment of the present invention.
Figure 11:
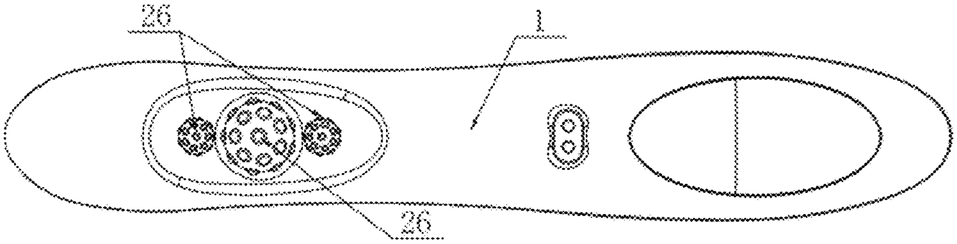
FIG. 11 is a schematic view of an embodiment of the present invention.

In the embodiments shown in FIGS. 6 and 8, the massage heads 26 are respectively provided on the front and rear connecting portions 234. In the present embodiment, one massage head 26 is provided on each of the connecting portions 234; or a plurality of massage heads 26 may be provided as shown in FIGS. 11 and 12, a plurality of connecting portions 234 may be provided on the front and rear sides, and one massage head 26 is provided on each of the connecting portions 234; and the massage head 26 on the connecting portion 234 on the front side extends through the extending opening 15 on the front side, while the massage head 26 on the connecting portion 234 on the rear side extends through the extending opening 15 on the rear side.

Figure 13:
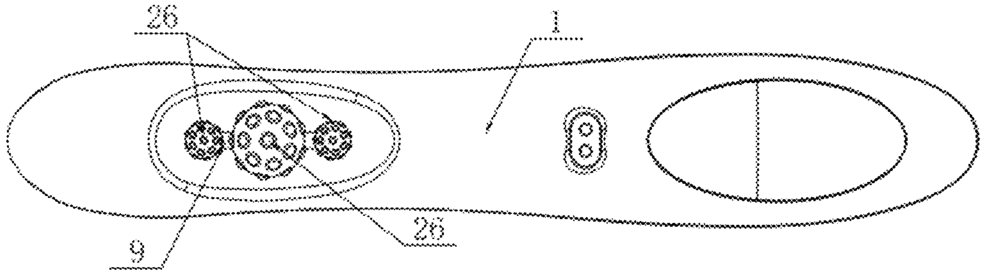
FIG. 13 is a schematic view of an embodiment of the present invention.
Figure 14:
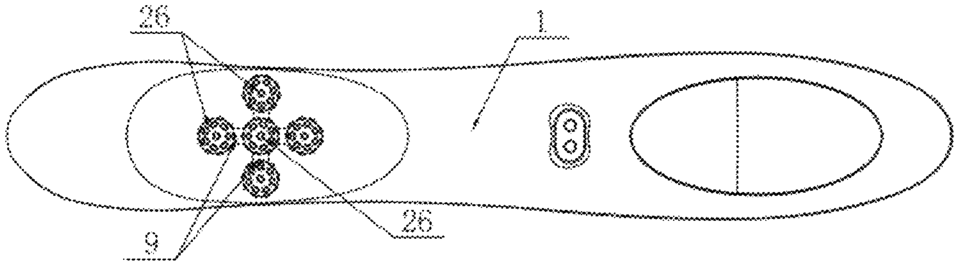
FIG. 14 is a schematic view of an embodiment of the present invention.

In the embodiments shown in FIGS. 7 and 9, the massage heads 26 are respectively provided on the connecting portions 234. In the present embodiment, one massage head 26 is provided on the connecting portion 234; or a plurality of massage heads 26 may be provided as shown in FIGS. 11 and 12, a plurality of connecting portions 234 may be provided, and one massage head 26 is provided on each of the connecting portions 234; and the massage head 26 on the connecting portion 234 extends through the extending opening 15 on the front side. Alternatively, as shown in FIGS. 13 and 14, adjacent massage heads 26 may be connected by a connecting rod 9.

Therefore, operation of the first motor 21 can drive the peristaltic sliding member 23 to move, so that the peristaltic sliding member 23 can drive the massage head 26 in the action cavity 14 through the connecting portion 234 to realize reciprocating peristaltic movement, and the massage head 26 at the action cavity 14 and other structures in the mounting inner cavity 13 are left and right staggered, so that the action cavity 14 can provide sufficient space for the massage head 26 to be arranged at a suitable position to perform more accurate massage.

Here, the gripping body 1 shown in FIGS. 6 to 9 is provided with a first guide portion 16 between the mounting inner cavity 13 and the action cavity 14, and the connecting portion 234 is provided with a first sliding portion 2341 slidably fitted to the first guide portion 16, so that the first sliding portion 2341 extends from the mounting inner cavity 13 into the action cavity 14 and is connected with the massage head 26, and the guide sliding is more stable owning to the fit between the first guide portion 16 and the first sliding portion 2341. In addition, the gripping body 1 shown in FIGS. 8 and 9 is provided with a second guide portion 17 at a left end of the action cavity 14, and the connecting portion 234 is provided with a second sliding portion 2342 slidably fitted to the second guide portion 17, so that the guide sliding is more stable owing to the fit between the second guide portion 17 and the second sliding portion 2342.

Specifically, the gripping body 1 includes a first inner shell 51, a second inner shell 52, and the elastic outer shell 4; the first inner shell 51 and the second inner shell 52 are made of a hard material, and the elastic outer shell 4 is plastic-coated on outer peripheries of the first inner shell 51 and the second inner shell 52 respectively; the mounting inner cavity 13 is arranged in the first inner shell 51, the action cavity 14 is arranged between the first inner shell 51 and the second inner shell 52, and the third functional portion 123 is arranged in the second inner shell 52; and the elastic outer shell 4 covers an outer periphery of the connecting portion 234 to seal the first guide portion 16 and the second guide portion 17, thus cutting off the mounting inner cavity 13 and the action cavity 14, and the elastic outer shell 262 on the massage head 26 does not need to be integrally connected with the elastic outer shell 4.

Therefore, the first inner shell 51 provides the mounting inner cavity 13 for the peristaltic mechanism 2 to be mounted, the second inner shell 52 provides a mounting space for the vibration motor 7, and the first inner shell 51 and the second inner shell 52 are connected and sealed by the plastic-coated elastic outer shell 4, thus having the effect of dustproofing and waterproofing.

What is claimed is:

1. A peristaltic massager, comprising: a gripping body; and a peristaltic mechanism, the peristaltic mechanism comprising a peristaltic sliding member and a reciprocating driving mechanism; the peristaltic sliding member being movably arranged on a massage portion for massage on the gripping body, and at least one massage head of the peristaltic sliding member protruding from a surface of the massage portion of the gripping body; the reciprocating driving mechanism being mounted in the gripping body, and the reciprocating driving mechanism and the peristaltic sliding member are arranged in linkage; and the reciprocating driving mechanism drives the massage head of the peristaltic sliding member to perform linear reciprocating motion on the surface of the massage portion of the gripping body; wherein the reciprocating driving mechanism comprises a first motor, a rotating screw and a linkage member; the first motor is configured to drive the rotating screw to rotate, and the peristaltic sliding member is arranged to slide along an axial direction of the rotating screw; a reciprocating track is provided on the rotating screw, the reciprocating track comprises a first spiral track, a second spiral track and transition tracks, the first spiral track and the second spiral track have opposite spiral directions and are arranged to intersect, two transition tracks are provided, and the two transition tracks respectively connect same ends of the first spiral track and the second spiral track; and the linkage member is rotatably arranged on the peristaltic sliding member, the linkage member is provided with a fitting portion fitted in the reciprocating track, the fitting portion is arranged in an arc shape, and the linkage member rotates relative to the peristaltic sliding member to change an arc length direction of the fitting portion.

2. The peristaltic massager according to claim 1, wherein the massage head comprises a hard inner core and an elastic outer sheath, the hard inner core is connected with the peristaltic sliding member, the elastic outer sheath is arranged on an outer periphery of the hard inner core, and a plurality of massage protrusions are arranged on an outer periphery of the elastic outer sheath.

3. The peristaltic massager according to claim 2, wherein the gripping body comprises a hard inner shell and an elastic outer shell, and the elastic outer shell is arranged on an outer side of the hard inner shell;

a mounting inner cavity is provided in the hard inner shell, the mounting inner cavity is configured to mount the peristaltic mechanism, and the outer side of the hard inner shell is provided with extending openings inwardly penetrating and communicating with the mounting inner cavity for the massage head to extend to the outer side of the hard inner shell; and the elastic outer sheath is integrally formed with the elastic outer shell to close the extending openings.

4. The peristaltic massager according to claim 3, wherein the peristaltic sliding member comprises a sleeve portion sleeved on an outer periphery of the rotating screw and an extension portion provided on an outer periphery of the sleeve portion, the extension portion penetrates outwardly out of the extending openings and is connected with the hard inner core.

5. The peristaltic massager according to claim 4, wherein two extending openings are provided, and the two extending openings are arranged on opposite sides of the mounting inner cavity; and each of the extending openings is provided with at least one massage head.

6. The peristaltic massager according to claim 2, wherein the mounting inner cavity and an action cavity adjacent thereto are provided in the gripping body, the mounting inner cavity is configured to mount the peristaltic mechanism, and the action cavity is located at one end of the mounting inner cavity along the axial direction of the rotating screw;

the peristaltic sliding member is provided with a connecting portion extending from the mounting inner cavity into the action cavity, and the connecting portion is connected with the massage head; and the action cavity is provided with the extending openings from which the massage head extends on one side perpendicular to the axial direction of the rotating screw.

7. The peristaltic massager according to claim 6, wherein the gripping body is provided with a first guide portion between the mounting inner cavity and the action cavity, and the connecting portion is provided with a first sliding portion slidably fitted to the first guide portion.

8. The peristaltic massager according to claim 6, wherein two extending openings are provided, and the two extending openings are arranged on opposite sides of the action cavity; and two sets of massage heads are provided, and the two sets of massage heads extend from different extending openings.

9. The peristaltic massager according to claim 1, wherein the massage portion of the gripping body is provided with a protruding second functional portion at one end thereof facing a gripping portion of the gripping body, and the second functional portion extends in a direction away from the gripping portion of the gripping body; and a vibration device is provided in the second functional portion, and the second functional portion is provided with a massage contact at one end thereof away from the gripping portion.

10. The peristaltic massager according to claim 1, wherein the massage portion of the gripping body is provided with a third functional portion at one end thereof away from the gripping portion of the gripping body, and a vibration motor is provided in the third functional portion.

11. The peristaltic massager according to claim 1, wherein an axis of the peristaltic mechanism and an axis of the gripping body are arranged coaxially of parallel to each other.

12. The peristaltic massager according to claim 1, wherein the axis of the peristaltic mechanism is arranged inclined relative to the axis of the gripping body.

* * * * *